May 5, 1931.  L. E. LA BOMBARD ET AL  1,803,711

PARTIALLY SLICED WRAPPED BREAD

Filed Sept. 5, 1929

Inventors
Leon E. LaBombard
Melvin H. Sidebotham
by A. W. Harrison
Attorney

Patented May 5, 1931

1,803,711

UNITED STATES PATENT OFFICE

LEON E. LA BOMBARD, OF WALTHAM, AND MELVIN H. SIDEBOTHAM, OF NEWTON-VILLE, MASSACHUSETTS, ASSIGNORS TO SPECIALTY AUTOMATIC MACHINE COMPANY, OF CHELSEA, MASSACHUSETTS, A CORPORATION OF MASSACHUSETTS

PARTIALLY SLICED WRAPPED BREAD

Application filed September 5, 1929. Serial No. 390,574.

This invention relates to the preservation of food, and has particular reference to wrapped loaves of bread so treated as to enable users to readily remove slices without having to employ a cutting implement.

A widely practiced custom at present is to deposit completely sliced loaves in shallow open-top trays, and then wrap each complete assemblage of slices and the holding tray in waxed paper.

Naturally, a sliced loaf can not be properly deposited in or on a tray as easily as could be effected if the loaf were not sliced, and when a customer removes some of the slices, after necessarily removing the wrapper or partly opening it, those slices which remain in or on the tray fall somewhat apart. Then, if the remaining slices are to be kept in proper condition by protecting them from the atmosphere, they must be closed together before effecting a snug re-enclosing of such un-used slices in the wrapper.

One of the objects of the present invention is to facilitate wrapping of sliced loaves of bread or other articles of food, by ensuring retention of the slices together while being wrapped.

Another object is to provide wrapped sliced food more economically than when holding trays are employed.

Another object is to supply consumers with wrapped sliced food in such condition as to enable some of the slices to be removed from the wrapper without disarranging the remaining slices, thereby materially reducing liability of the remaining slices becoming affected by the atmosphere.

With such objects in view, the invention consists in the articles and the method of producing the same, substantially as hereinafter described and claimed.

Of the accompanying drawings.

Similar reference characters indicate similar parts or features in all of the views.

For the sake of brevity of description, the invention will be explained as relating to the preservation of bread, but it is to be understood that by the terms "loaf" and "bread" we do not limit ourselves to such specific articles of food.

In carrying out our invention, the loaf is so sliced that small portions of it are left un-cut, as indicated at $b$. In other words, any number of transverse cuts (according to the number of slices into which the loaf is to be ultimately converted) are made in the loaf, and then the loaf, in such incompletely sliced condition, is enclosed in a wrapper $c$ either manually or by any wrapping machine.

While the cutting may be effected by a manually operated knife, we have illustrated so much of a machine for doing it as is necessary to an understanding of the same. Such machine includes a shelf or guideway 12 along which the loaves are successively moved to a temporary stationary position between two sets of thin rotary blades, which two sets of blades are far enough apart when a loaf is moved to position to be cut, to permit the loaf to arrive between them.

Figure 3:
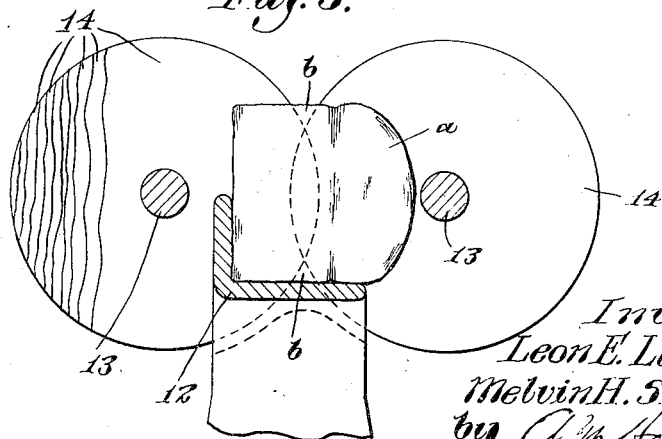
Figure 3 is a sectional view illustrating sufficient of a mechanism which may be employed for effecting partial slicing, to enable the method to be understood.

Each set of blades is carried by a shaft 13, and there are as many blades 14 carried by each shaft as are required to effect the conversion of the bread into slices. For instance, if the loaf is to be divided into eighteen slices including the two end-crust slices, there will be seventeen blades 14 in each set. In Figure 3 some of the left-hand blades are illustrated as successively broken away to indicate the plurality of blades.

The blades are equally spaced in both sets and all those of one set are mounted in the same plane as those of the other set in order to operate as presently described.

Both shafts 13 and their sets of blades 14 may be connected together so as to be moved simultaneously and equally to the right and left alternately, or they may be operated independently of each other. In either case however they are never close enough together at the beginning of an operation to obstruct introduction of a loaf to a position between them.

In operation, when a loaf has arrived between the two sets of blades, one set, as the right one, is moved in a direction toward the other or left set to a distance not far enough to cut entirely across the loaf. Then, as the right set of blades is withdrawn to its outer position, the left set of blades follows the retreating movement of the right set, the said left set cutting into the opposite side of the loaf from that which had been cut into by the right set, the cuts made by the left set joining or merging with those made by the right set. Preferably the blades of the two sets never come close enough together to overlap. The only reason for illustrating them in Figure 3 as overlapping is to make clear the inward extent of their movement so as to leave un-cut portions $b$.

The relative degree of inward movements of the two sets of blades is such that while the cuts effected by the two sets are complete through the major portion or body of the loaf, and through most of the crust thereof, there are two integral opposite side portions of the loaf left un-cut as indicated at $b$.

Such un-cut portions $b$ may be quite small and yet, since they include side crust portions of the loaf, they are sufficient to maintain the cut article in form for the wrapping operation customarily employed.

It is to be understood, of course, that the shelf or guideway 12 is provided with slits or crevices to permit the blades 14 to move transversely of it.

Figure 1:
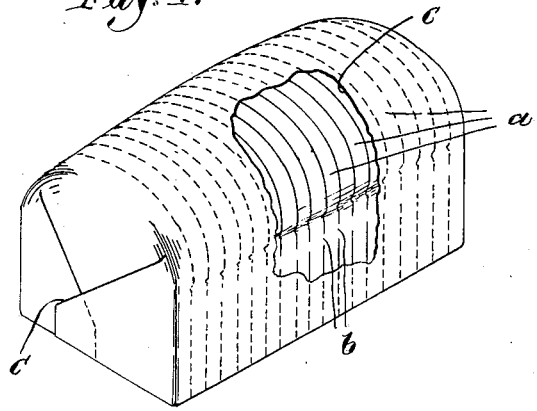
Figure 1 is a perspective view of a wrapped loaf, the wrapper being partially broken out to illustrate the slices with their connecting portions.
Figure 2:
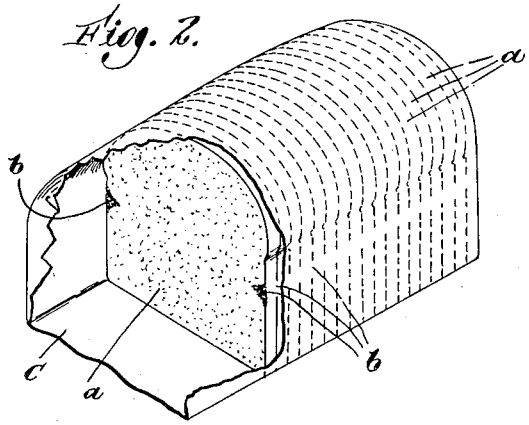
Figure 2 is a similar view but illustrating the article in a condition when a consumer has removed some of the slices.

When such an article as illustrated by Figure 1, in a complete wrapper, reaches a user, the latter may open one end of the wrapper and remove some of the slices. The un-cut portions $b$ permit this to be done easily by a slight pulling action. Such removal of some of the slices does not separate the remaining slices because the portions $b$ being in two separated locations are sufficiently tenacious to prevent unintentional separation. Therefore the remaining slightly-joined slices can be instantly re-enclosed in the wrapper or, if the first opening has torn the original wrapper too much, the remaining un-desired slices are readily handled in joined relationship while being enclosed in a fresh wrapper, or they may be put in a suitable container without a wrapper because the slices will not fall apart but will remain snugly together. It is the connecting of the edges of the individual slices together that first facilitates the wrapping and then enables a user to remove some slices without disarranging the others.

While the practice of our invention renders it unnecessary to use trays such as we have referred to as now commonly employed, all of the advantages which we have explained (except that of economy) would still exist if trays are used and the in-completely sliced loaves are placed therein before wrapping.

The mechanism which we have illustrated and described is not claimed herein, but will form the subject matter of a separate application.

Having now described our invention, we claim:

1. A loaf of bread having slicing cuts extending in from opposite sides thereof and partially meeting, said article having separated un-cut portions to lightly maintain the article as a unit, said unit being enclosed in a wrapper, the said un-cut portions being disposed in such positions as to maintain the individual slices in close relationship throughout their areas.

2. The method of preserving bread in a form convenient for users, consisting in transversely cutting a loaf in from opposite sides to an incomplete extent leaving separated un-cut portions in line with said transverse cuts, and then enclosing the cut loaf in a wrapper.

In testimony whereof we have affixed our signatures.

LEON E. LA BOMBARD.
MELVIN H. SIDEBOTHAM.